United States Patent

Roberts

[11] Patent Number: 6,123,806
[45] Date of Patent: Sep. 26, 2000

[54] PROCESS FOR KRAFT CHEMICAL RECOVERY

[75] Inventor: Christopher M. Roberts, Pensacola, Fla.

[73] Assignee: Champion International Corporation, Stamford, Conn.

[21] Appl. No.: 09/116,513

[22] Filed: Jul. 16, 1998

[51] Int. Cl.[7] .................................................. D21C 11/06
[52] U.S. Cl. ........................... 162/14; 162/29; 162/30.11
[58] Field of Search .................. 162/14, 30.1, 30.11, 162/29; 110/346, 347, 348

[56] References Cited

U.S. PATENT DOCUMENTS

| | | | |
|---|---|---|---|
| 4,135,968 | 1/1979 | Dehaas | 162/30.1 |
| 4,241,722 | 12/1980 | Dickinson | 126/263 |
| 4,284,015 | 8/1981 | Dickinson | 110/347 |
| 4,292,953 | 10/1981 | Dickinson | 126/263 |
| 4,377,066 | 3/1983 | Dickinson | 60/39.05 |
| 4,380,960 | 4/1983 | Dickinson | 110/347 |
| 4,668,342 | 5/1987 | Blackwell | 162/30.11 |
| 4,714,032 | 12/1987 | Dickinson | 110/347 |
| 4,898,107 | 2/1990 | Dickinson | 110/346 |
| 5,000,099 | 3/1991 | Dickinson | 110/238 |
| 5,050,375 | 9/1991 | Dickinson | 60/39.12 |
| 5,261,225 | 11/1993 | Dickinson | 60/39.55 |
| 5,480,512 | 1/1996 | Sannholm | 162/16 |
| 5,485,728 | 1/1996 | Dickinson | 60/648 |
| 5,607,549 | 3/1997 | Koskiniemi | 162/30.11 |
| 5,685,153 | 11/1997 | Dickinson | 60/648 |

*Primary Examiner*—Dean T. Nguyen

[57] ABSTRACT

A method of recovering chemicals from spent black liquor used in a kraft pulping process comprising organic materials having oxygen containing functional groups, the method comprising heating the black liquor at an elevated temperature and at a corresponding pressure at which there is no or substantially no boiling of the black liquor, until all or a portion of the oxygen is converted into carbon dioxide to form a slurry comprising microparticulate char and a green liquor suspension. The heating can be accomplished with any suitable means. For example, black liquor is evaporated in an evaporator train, and the liquor pumped in a high pressure pump to a suitable pressure, as for example, a pressure of from about 1200 psig to about 2000 psig. Thereafter, the liquor is transferred to a heat exchanger and heated to the elevated temperature, as for example a temperature of at least about 475° F. The liquor is then transferred to a reactor and is maintained in the reactor until the spent black liquor is reduced to a slurry.

23 Claims, 2 Drawing Sheets

PROCESS FOR KRAFT CHEMICAL RECOVERY

BACKGROUND OF THE INVENTION

1. Field of the Invention

This invention relates to a process for recovering kraft chemicals from spent cooking liquors in the paper pulping process. In particular, the invention relates to a novel way of processing the liquors as a slurry rather than as a homogeneous solution.

2. The Prior Art

In a typical papermaking process, pulp is prepared from wood by either chemical or mechanical pulping processes. In the more common chemical process, wood chips are loaded into a pressure vessel known as a digester which is charged with a chemical reagent. Heat is supplied to the digester to "cook" the wood chips to remove undesirable substances such as lignin from the wood and to liberate the desirable cellulosic fiber.

A widely used chemical pulping process is the "kraft" pulping process, which uses an alkaline chemical reagent referred to as "white liquor" to act upon the lignin in the material. Typically, the white liquor is an alkaline solution of sodium hydroxide (NaOH) and sodium sulfide ($Na_2S$), provided by an aqueous solution typically containing between about 80–90 grams/liter of NaOH and about 20–25 grams/liter $Na_2S$ with minor amounts of sodium carbonate, sulfate and thiosulfate. Depending upon the wood species used and the desired end product to be manufactured, white liquor is added to the wood chips in sufficient quantity to provide a total charge of alkali of 15–20% $Na_2O$ based on the dried weight of the wood.

Typically, the temperature of the wood/liquor mixture is maintained at about 165°–170° C. for a total reaction time of about 2–3 hours. When digestion is complete, the pressure in the digester is released and the resulting wood pulp is separated from the spent liquor, called "black liquor" in a series of washing operations.

The pulping chemicals are recovered from the black liquor by a process that is commonly referred to as the recovery process. The black liquor, which contains organic constituents and sodium, is concentrated and then burned in a process referred to as smelting to reduce the organic constituents to $CO_2$ and $H_2O$. The ash from the smelting operation containing sodium carbonate, or soda ash, is mixed with water to form a weak solution known as "green liquor". The solid particles in the green liquor, the "dregs" are then removed from the green liquor. The green liquor is subsequently causticized through the addition of lime to regenerate white liquor. This entire process can be time consuming and expensive.

It has been known that low grade fuels such as industrial waste may be more efficiently converted to energy if the fuel is provided in a slurry and heated at high pressure until the chemically bound oxygen is converted to $CO_2$ gas. Such a process is described in U.S. Pat. No. 5,485,728 to Dickenson.

Thermal treatment thus appears to have beneficial properties in the processing of waste materials. Its application to the chemical recovery in paper pulping processes has not been done prior to the present invention but would appear to offer beneficial results.

SUMMARY OF THE INVENTION

It is therefore an object of the present invention to provide an improved method for the recovery of the kraft chemicals using fewer steps than the conventional method.

It is anther object of the present invention to provide an improved method for kraft chemical recovery that reduces black liquor solids, water and liquor volume.

It is a further object of the present invention to provide an improved method for kraft chemical recovery that increases the capacity of the existing recovery process.

It is yet a further object of the invention to provide an improved method for kraft chemical recovery that is less expensive than traditional methods.

These and other objects of the invention are accomplished by a method for recovering kraft chemicals comprising heating black liquor used in the kraft pulping process and comprising organic materials having oxygen containing functional groups for a sufficient time and at a sufficient elevated temperature and corresponding pressure (such that there is no or substantially all boiling) to convert all or a portion of the mass of oxygen into carbon dioxide. The elevated temperature may vary widely and is a temperature which is sufficiently high to carry out the desired conversion of oxygen to carbon dioxide. The upper temperature limited may be of any value and is primarily limited by the capability of the reaction or heating vessel or apparatus to withstand the resulting pressure. The temperature is preferably at least about 475° F., more preferably from about 475° F. to about 625° F. and most preferably from about 500° F. to about 575° F. In the embodiments of choice, the temperature is about 550° F. Heating times may very widely. The black liquor is heated at the elevated temperature for a time sufficient to convert the desired amount of oxygen into carbon dioxide. In general, the higher the temperature, the shorter the heating time required to convert a given mass of oxygen into carbon dioxide; and conversely, the lower the temperature, the longer the heating time required for such conversions. Usually, when employing preferred temperatures, heating times may be from 0 to about 60 minutes or longer converted from a homogeneous alkali lignin/soda-sulfur/water solution into a microparticulate char slurry in a green liquor suspension.

The reaction chemistry of this process is as follows:

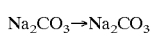

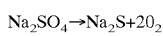

In the reducing environment (absence of $O_2$) of the thermal treatment, salt cake is reduced to sodium sulfide in a similar manner to the reduction in the smelt bed of a recovery boiler. Sodium carbonate, as in a recovery boiler, is retained as the same. Alkali lignins are reduced to carbonaceous char, sodium hydroxide, sodium sulfide and other unknown soda compounds.

During this process, the following two characteristics are observed:

1) All or a portion of the oxygen containing functional groups such as C—O, C=O and O—C=O terminal and conjugate groups contained in the organic material component of the spent black liquor are split off as $CO_2$, thus decreasing the degree of polymerization and thus the average molecular weights of components such as alkali lignins and carboxylic acids.

2) All or a portion of the oxygen present in the organic material component of the spent black liquor is converted to carbon dioxide in the reaction. The actual amount of oxygen converted will vary depending upon a number of factors as for example, the types of organic components in the black liquor as for example resins and acids. In general, higher percent conversions of oxygen are preferred. Usually, at least about 50% of the total mass of oxygen is converted into carbon dioxide. The percent conversion is preferably at least about 60%, more preferably at least about 75% and most preferably from about 75% to about 85%.

The process according to the invention first involves passing black liquor into an evaporator train where it passes through one or more evaporators. The liquid is then pumped into a high pressure pump where the pressure is increased so that the liquid does not boil when heated. The liquid is then fed into a heat exchanger and then into a heated reactor for a specified amount of time. The reacted product is then cooled by a reactor feed and the flash gas is returned to the evaporators where it is condensed. The pressure is then reduced to atmospheric pressure and the product is fed into an agitated product tank. At this point several methods of additional processing are available.

For example, the reacted black liquor, after filtration, may be fired in a coal or bark boiler since the green liquor has been removed. This increases the number of options for a recovery limited mill and likewise increases the pulping capacity of a mill, since more black liquor solids do not present a bottleneck at the recovery boiler.

The filtrate from the reacted liquor may be passed directly into the green liquor system and causticized using existing equipment and procedures. The filtered char may be burned in a recovery or power boiler.

Another treatment involves adding lime to the black liquor slurry in a slaker, with the resultant slurry being causticized and then filtered, thus producing white liquor directly from the black liquor. The char-lime-mud slurry may then be burned in a fluidized bed calciner equipped to reclaim heat. This scenario eliminates the recovery boiler, evaporators, lime kiln and green liquor system.

The conversion of the black liquid into a filterable slurry through this thermal treatment allows for several considerations:

1. Assuming that oxygen accounts for 35% of the mass of the organic fraction of the unreacted black liquor, and the oxygen is converted to carbon dioxide using carbon present in the lignin structure, a significant portion of the mass of the organic component of black liquor exits as carbon dioxide.

2. The conversion of complex water-soluble polymers (alkali lignins) to hydrophobic char allows the organic fraction of the reacted liquor to be separated from the aqueous inorganic portion through conventional filtration methods. This eliminates the need for solids concentration via evaporation.

4. The viscosity of the reacted liquor, as compared to the viscosity of the unreacted black liquor, is reduced, preferably to a significant extent. A reactor product liquor at 80% solids will have approximately the same viscosity as unreacted black liquor at 60% solids.

Thus, the present invention has significant benefits over conventional recovery processes.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
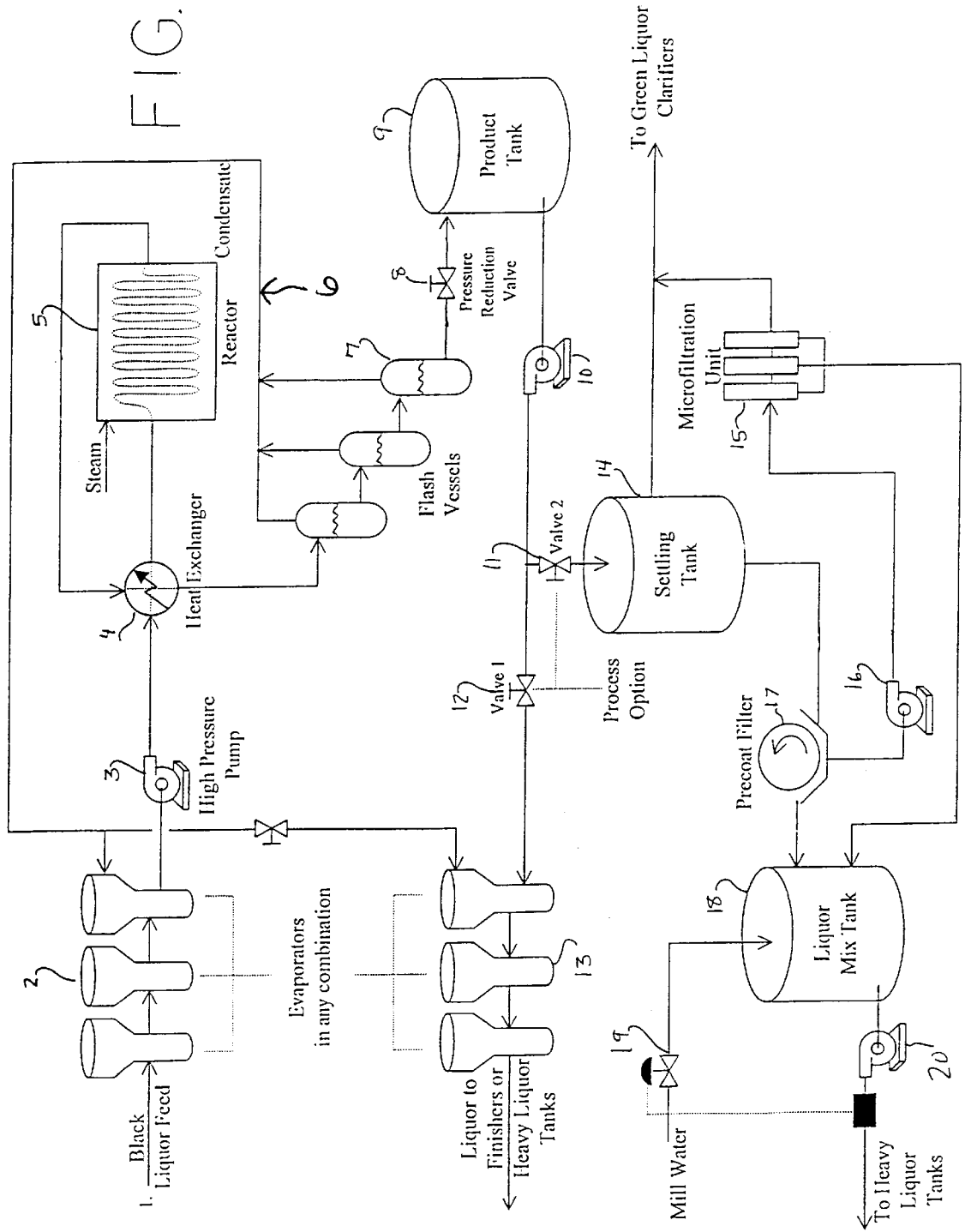
FIG. 1 shows a flow diagram of one embodiment of the recovery process according to the invention.

Referring now in detail to the drawings and, in particular, FIG. 1 there is shown a flow diagram depicting the inventive process for thermally treating black liquor 1. The black liquor 1, which has approximately 15–18% solids by mass is fed into an evaporator train comprising a plurality of evaporators 2. Typically, the desired concentration of the product from the evaporator train is approximately 30–50% solids.

At the outlet of evaporators 2, liquor 1 pumped by a high pressure pump 3 to a pressure between 1200 psig and 2000 psig. This pressure is necessary to prevent the liquid from boiling when is heated. From pump 3, the liquid is transferred to a heat exchanger 4 where it is heated at a temperature of from, about 500° F. to about 575° F. with a corresponding pressure such that the heated liquor does not boil, and is then transferred to a heated reactor 5 which is heated by some suitable heating means as for example steam. Reactor 5 to designed so that a residence time of from 0 to 60 minutes is attained and is in the form of a coiled tube, downflow tube, upflow tube or horizontal tube reactor. A gas vent (not shown) may also be used to remove buildup of product gases.

From reactor 5, the product is passed through the return side of heat exchanger 4 and then through a set of flash vessels 7. Any flash gas 6 is returned to evaporators 2 where it is condensed with a condenser (not shown) and its heat reclaimed. The non-condensible gases contain some heat value when combusted and are used as fuel in the lime kiln or calciner. The product exiting flash vessels 7 has approximately 40–70% solids and is at about 100 psig. The pressure is then reduced in a pressure reduction valve 8 until the product is at atmospheric pressure. The product is then transferred to an agitated product tank 9.

At this point, the slurry produced from the above steps may be treated in several different ways. For example, it may be pumped by pump 10 into a settling tank 14. In settling tank 14, the suspended organic solids fall to the bottom of the tank and the resulting green liquor solution may be drawn away for clarification.

The settled solids in settling tank 14 are pumped to a precoat filter rotary drum 17 to separate the organic solids from the green liquor filtrate. The solids then flow from filter 17 to a liquor mix tank. A dilution line to the tank is controlled dependent on the desired concentration of solids to be pumped from mix tank 18 with pump 20 to heavy liquor tanks (not shown).

The filtrate from filter 17 is pumped via pump 16 to a microfiltration unit 15 to remove any remaining suspended solids. Microfiltration unit 15 can also be used to remove suspended solids from the green liquid solution removed from settling tank 14. The filtrate from microfiltration unit 15 is then passed to the green liquor system. Solids collected in the microfiltration unit are passed into liquor mix tank 18.

Another way of treating the slurry from product tank 9 is to pump it via pump 10 into a second set of evaporators 13 until it is brought to the desired solids concentration, where it is then transferred to heavy liquor tanks (not shown).

Figure 2:
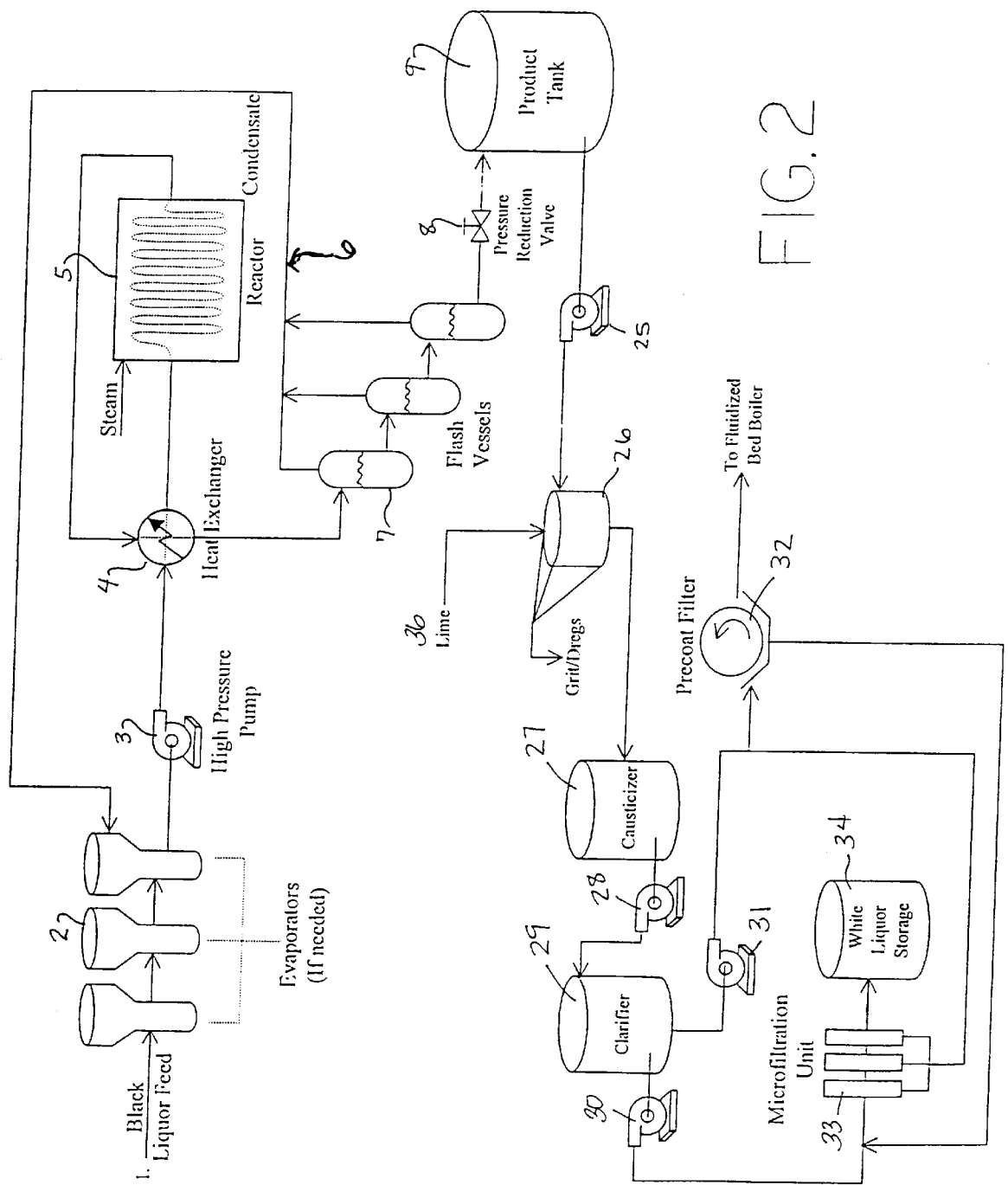
FIG. 2 shows a flow diagram of a second embodiment according to the invention.

Yet another method of treating black liquor according to the invention is shown in FIG. 2. In this embodiment, black liquor 1 proceeds through the same thermal treatment as discussed with respect to FIG. 1 until it reaches product tank 9. At this point, the slurry from product tank 9 is pumped via pump 25 into a slaker 26 where lime 36 is added. The grit and dregs are then removed from the slaker 26 with a screw feeder (not shown). Slurry from slaker 26 is then passed to a set of one or more causticizers 27 to allow the sodium carbonate to be converted to sodium hydroxide. From causticizer 27, the slurry is pumped via pump 28 to a clarifier 29, where white liquor is drawn off at a level above a clarification zone and pumped via pump 30 to a microfiltration unit 33. The white liquor filtrate obtained from microfiltration unit 33 is stored in a white liquor storage 34. Any solids from microfiltration unit 33 are passed to a precoat filter 32 for further filtration.

The slurry collected at the bottom of clarifier 29 is pumped via pump 31 to precoat filter 32. Other filtration devices could also be used. The filtrate from precoat filter 32 is then passed to microfiltration unit 33. The filtered solids are subsequently burned to reclaim heat and convert calcium carbonate to calcium oxide. This heat reclamation and conversion may be accomplished in a fluidized bed boiler, moving grate boiler, pressurized-fluidized-bed-combuster (PFBC), conventional rotary lime kiln or the slurry may be diluted somewhat and combusted in a conventional recovery boiler equipped for this alternative fuel.

The processes described above yield a significant benefit in the recovery of kraft chemicals. The following example illustrates the effect that the inventive process has on black liquor.

EXAMPLE

A 100 lb sample of black liquor containing approximately 30% solids was treated with the process described above, and its properties tested after the black liquor was received in product tank 9. The properties of the black liquor before and after processing are set forth below in Table I.

Table I

| Component | Before reaction | | After reaction | |
| --- | --- | --- | --- | --- |
| | Mass (lb) | State | Mass (lb) | State |
| Water | 70.0 | Aqueous | 70 | Aqueous |
| Carbon | 10.56 | Aqueous | 9.40 | Particulate |
| Carbon Bound Oxygen | 4.14 | Aqueous | 1.03 | Particulate |
| Hydrogen Bound Carbon | 1.17 | Aqueous | 1.17 | Particulate |
| Sodium Hydroxide | 0.00 | n/a | 0.00 | n/a |
| Sodium Carbonate | 9.54 | Aqueous | 9.54 | Aqueous |
| Sodium Sulfate | 4.53 | Aqueous | trace | Aqueous |
| Sodium Sulfide | 0.00 | n/a | 2.49 | Aqueous |
| Carbon Dioxide | 0.00 | n/a | 4.27 | Gas |
| Oxygen | 0.00 | n/a | 2.04 | Gas |

Residual sodium sulfate and sodium hydroxide were not factored into the calculations and their presence would not affect the calculations.

As can be seen from the above table, several benefits are achieved with the process according to the invention. Assuming that the reacted liquor is subsequently processed, the solids fired to a recovery boiler are reduced by 61.3%. In addition, the amount of water carried to the boiler with the liquor is reduced by 82.1% and the volume of black liquor is reduced by 68.6%.

The process according to the invention greatly reduces the amount of organic mass of black liquor. While it may appear that this reduction would also reduce the heat of combustion, only a 3% reduction in the heat of combustion has been observed, most of this caused by the exiting of $CO_2$. This loss is greatly offset by the reduction in the evaporative heat requirements of the water present and reduction in the heat loss due to inorganic dead load when fired in a boiler.

Another benefit derived from the process according to the invention is the densification of energy. A typical black liquor has a heat of combustion of about 6,500 BTU/lb. on a dry basis. After thermal treatment and filtration according to the invention, the liquor slurry will have a theoretical heat of combustion of 16,290 BTU/lb. The actual heat of combustion has been found to be approximately 85% of the theoretical value, or 13,848 BTU/lb.

Accordingly, while only a few embodiments of the present invention have been shown and described, it is obvious that many changes and modifications may be made thereunto without departing from the spirit and scope of the invention.

What is claimed is:

1. A method of recovering pulping chemicals from a spent black liquor generated in a kraft pulping process, said spent black liquor comprising organic materials having oxygen containing functional groups, said method comprising heating the spent black liquor for a reaction time and at a reaction temperature and at a reaction pressure at which there is no or substantially no boiling of the spent black liquor during said heating, such that all or a portion of the oxygen contained in said organic material is converted into carbon dioxide to form a heated suspension comprising a microparticulate char suspended in a green liquor liquid phase.

2. The method according to claim 1, whereas the step of heating comprises evaporating the black liquor, pumping the liquor in a high pressure pump to a pressure at which there is no or substantially no boiling of said black liquor when heated in a subsequent heating step, transferring the liquor to a heat exchanger, heating the black liquor to the elevated temperature to form heated liquor, transferring the heated black liquor to a reactor, and maintaining the heated black liquor in the reactor for a reaction time sufficient for conversion of all or a portion of the oxygen into the carbon dioxide.

3. The method according to claim 2 further comprising cooling the heated green liquor suspension to form a cooled suspension.

4. The method according to claim 3, further comprising the step of evaporating the cooled suspension until a desired suspended solids load is achieved.

5. The method according to claim 3, further comprising the steps of:

pumping the cooled suspension to a settling tank and allowing suspended solids to fall to the bottom of the tank;

drawing off the supernatant green liquor from the settling tank;

filtering the solids from the settling tank; and combining any green liquor filtrate obtained from said filtering step with said supernatant green liquor.

6. The method according to claim 5, wherein the step of filtering is carried out using a precoat filter.

7. The method according to claim 5, wherein the step of filtering is carried out using a microfiltration unit.

8. The method according to claim 5, wherein the step of filtering is carried out using both a precoat filter and a microfiltration unit.

9. The method according to claim 3, further comprising the steps of:
- adding lime to said cooled green liquor suspension in a slaker to form a mixture of green liquor suspension and lime;
- transferring green liquor suspension and lime mixture from the slaker to a causticizer for converting sodium carbonate to sodium hydroxide, wherein the green liquor suspension is converted into a white liquor suspension with solids;
- transferring the said white liquor and solids to a clarifier and drawing off the white liquor; and
- filtering any remaining white liquor in the clarifier from the solids.

10. The method according to claim 9, wherein the step of filtering is carried out using a microfiltration unit.

11. The method according to claim 9, wherein the step of filtering is carried out using a precoat filter.

12. The method according to claim 9, wherein the step of filtering is carried out using a microfiltration unit and a precoat filter.

13. The method according to claim 9, further comprising burning the solids.

14. The method according to claim 3 wherein said heated green liquor suspension is cooled by passing the heated green liquor suspension through one or more flash vessels, condensing any flash gas and reducing the pressure of the suspension to atmospheric pressure.

15. The method according to claim 3, further comprising separating all or a portion of suspended solids in said cooled green liquor suspension by sedimentation, filtration or a combination thereof.

16. The method according to claim 2 wherein the reaction temperature is at least about 475° F.

17. The method according to claim 16 wherein the reaction temperature is from about 475° F. to about 625° F.

18. The method according to claim 1 wherein the reaction temperature is at least about 475° F.

19. The method according to claim 18 wherein the reaction temperature is from about 475° F. to about 625° F.

20. The method according to claim 19 wherein the reaction temperature is from about 500° F. to about 575° F.

21. The method according to claim 19 wherein the reaction pressure is from about 1200 psig to about 2000 psig.

22. The method according to claim 1 wherein at least about 50% of the oxygen is converted into the carbon dioxide.

23. The method according to claim 1 wherein at least about 50% of the oxygen is converted into the carbon dioxide.

* * * * *